United States Patent
Konada et al.

(10) Patent No.: US 11,872,860 B2
(45) Date of Patent: Jan. 16, 2024

(54) DAMPER CONTROL APPARATUS

(71) Applicant: HONDA MOTOR CO., LTD., Tokyo (JP)

(72) Inventors: Kazuya Konada, Wako (JP); Takashi Yanagi, Wako (JP); Ryosuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 17/675,004

(22) Filed: Feb. 18, 2022

(65) Prior Publication Data
US 2022/0305867 A1     Sep. 29, 2022

(30) Foreign Application Priority Data
Mar. 23, 2021   (JP) .................................. 2021-048072

(51) Int. Cl.
*B60G 17/00*     (2006.01)
*B60G 17/0165*   (2006.01)

(52) U.S. Cl.
CPC .... *B60G 17/0165* (2013.01); *B60G 2400/204* (2013.01); *B60G 2400/208* (2013.01); *B60G 2400/41* (2013.01); *B60G 2400/82* (2013.01)

(58) Field of Classification Search
CPC ................ B60G 17/0165; B60G 17/06; B60G 2400/204; B60G 2400/0523; B60G 2500/10
See application file for complete search history.

(56) References Cited

U.S. PATENT DOCUMENTS 5,015,006 A * 5/1991 Takehara ............. B60G 17/016
                                                    280/5.513
5,116,078 A * 5/1992 Kanazawa ......... B60G 17/0163
                                                    701/41
(Continued)

FOREIGN PATENT DOCUMENTS

JP   H05-262118 A   10/1993
JP   H05-338425 A   12/1993
(Continued)

OTHER PUBLICATIONS

Office Action received in corresponding Japanese Application No. 2021-048072 dated Aug. 2, 2022 with English translation (8 pages).
(Continued)

*Primary Examiner* — Phutthiwat Wongwian
*Assistant Examiner* — Sherman D Manley
(74) *Attorney, Agent, or Firm* — Rankin, Hill & Clark LLP (57) ABSTRACT

A damper control apparatus for controlling a front damper at a front wheel and a rear damper at a rear wheel. The damper control apparatus includes: a preview sensor configured to detect a road surface state in front of a vehicle; a steering angle sensor configured to detect a steering angle of the vehicle; and a controller configured to control the front and rear dampers based on a detected value of the preview sensor. In response to the steering angle sensor detecting a steering angle that exceeds a predetermined steering angle threshold, the controller is configured to reduce control of the rear damper that is based on the detected value of the preview sensor.

8 Claims, 5 Drawing Sheets

(56) References Cited

U.S. PATENT DOCUMENTS

| | | | | |
|---|---|---|---|---|
| 5,162,996 A | * | 11/1992 | Matsumoto | B60G 17/018 |
| | | | | 701/37 |
| 11,370,414 B2 | * | 6/2022 | Takei | B60W 10/22 |
| 2010/0191420 A1 | * | 7/2010 | Honma | B60G 17/0162 |
| | | | | 701/38 |
| 2010/0324780 A1 | * | 12/2010 | Koumura | B60G 17/0182 |
| | | | | 701/38 |
| 2018/0113055 A1 | * | 4/2018 | Kubota | B60G 17/018 |
| 2018/0154723 A1 | * | 6/2018 | Anderson | H02K 11/33 |
| 2020/0156607 A1 | * | 5/2020 | Ueno | B60W 30/02 |
| 2021/0370738 A1 | * | 12/2021 | Furuta | B60G 17/018 |

FOREIGN PATENT DOCUMENTS

| | | |
|---|---|---|
| JP | 2009-119948 A | 6/2009 |
| JP | 2013-205196 A | 10/2013 |
| JP | 2016-190621 A | 11/2016 |
| JP | 2019-202648 A | 11/2019 |
| JP | 2020-82838 A | 6/2020 |

OTHER PUBLICATIONS

Office Action received in corresponding Japanese application No. 2021-048072 dated Nov. 22, 2022 with English translation (8 pages).

* cited by examiner

DAMPER CONTROL APPARATUS

CROSS-REFERENCE STATEMENT

The present application is based on, and claims priority from, Japanese Patent Application Number 2021-048072, filed Mar. 23, 2021, the disclosure of which is hereby incorporated by reference herein in its entirety.

BACKGROUND

Technical Field

The disclosure relates to a damper control apparatus.

Related Art

In Patent Literature 1 (Japanese Unexamined Patent Application Publication No. 2013-205196), a technology for controlling a damper of a vehicle based on a value detected by a sensor for detecting a state of a road surface in front of the vehicle.

With the technology disclosed in Patent Literature 1, the sensor is installed only at the front of the vehicle and is based on the premise that rear wheels follow the same path as front wheels of the vehicle. However, when a driver operates the vehicle so that a steering angle reaches or becomes greater than a predetermined angle causing the front and rear wheels to follow different paths, damper control in accord with the front wheels can result in a decline in ride comfort.

SUMMARY

An embodiment of the disclosure is a damper control apparatus for controlling a front damper with variable damping force at a front wheel and a rear damper with variable damping force at a rear wheel. The damper control apparatus includes: a road surface state detector configured to detect a road surface state in front of a vehicle; a vehicle turn degree detector configured to detect a degree of turn of the vehicle; and a controller configured to control the front damper provided at the front wheel and the rear damper provided at the rear wheel based on a detected value of the road surface state detector. In response to the vehicle turn degree detector detecting a degree of turn that exceeds a predetermined turn degree threshold, the controller is configured to reduce control of the rear damper based on a detected value of the road surface state detector.

DETAILED DESCRIPTION

A detailed description of a damper control apparatus according to an embodiment of the disclosure is given below with reference to drawings as deemed appropriate. In the description, a direction in which a vehicle moves forward is referred to as "front", a direction in which the vehicle moves backwards as "back", a side of the vehicle that is vertically upwards as "up", a side of the vehicle that is vertically downwards as "down", and lateral directions parallel to the width of the vehicle (widthwise) as "left" and "right".

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
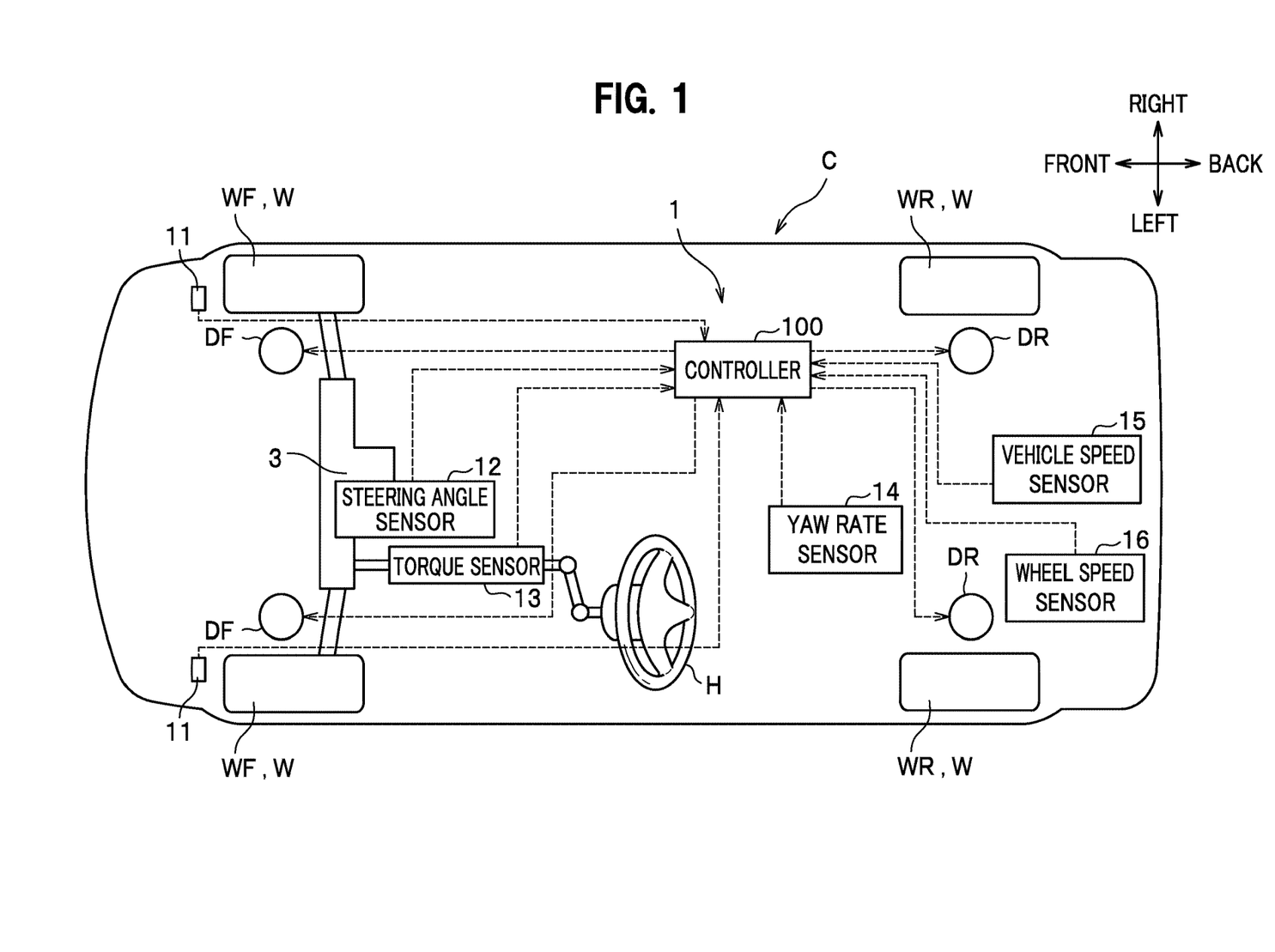
FIG. 1 is a diagram showing an overall configuration of a vehicle installed with a damper control apparatus in accordance with at least one embodiment of the disclosure.

FIG. 1 is a diagram showing an overall configuration of a vehicle installed with a damper control apparatus in accordance with an embodiment.

As shown in FIG. 1, a damper control apparatus 1 according to the embodiment is installed in a vehicle C. The vehicle C is a four wheeled vehicle that includes an internal combustion engine (now shown) and four wheels Ws. The four wheels Ws include two front wheels WF and WF and two rear wheels WR and WR. The front wheels WFs are wheels that turn with steering (turning wheels). The vehicle C is equipped with electric power steering (EPS). An EPS device of the vehicle C aids a driver of the vehicle C by reducing the steering effort required to turn the front wheels. This assistance is provided by driving an electric motor 3. The EPS device is known art.

Figure 2:
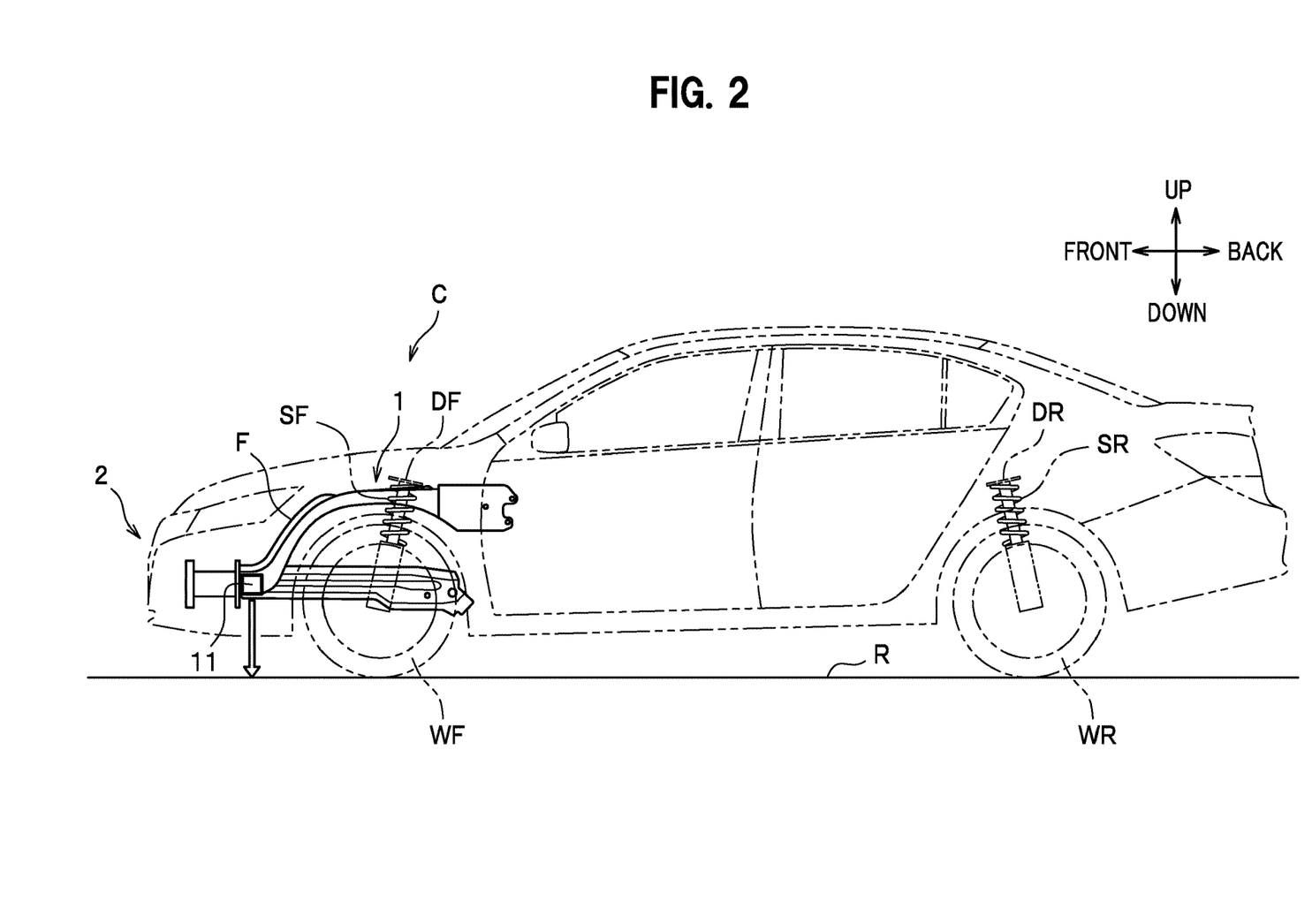
FIG. 2 is a diagram showing a configuration of a vehicle installed with a damper control apparatus in accordance with at least one embodiment of the disclosure.

Each front wheel WF of the vehicle C is provided with a suspension that includes a front damper DF (a damper) and a spring SF (see FIG. 2). Each rear wheel WR of the vehicle C is provided with a suspension that includes a rear damper DR (a damper) and a spring SR (see FIG. 2). The front damper DF and rear damper DR are configured from a variable damping force damper of known art whose damping force can be changed arbitrarily. A damper for which embodiments of the disclosure is applicable is not limited to a variable damping force damper. An embodiment of the disclosure may be applied to an active suspension.

The vehicle C also includes preview sensors (road surface state detectors) 11 and 11 that detect a state of a road surface R (see FIG. 2) in front of a vehicle (in front of the vehicle C). The vehicle C also includes a controller 100 that controls the front dampers DFs and rear dampers DRs based on a detected value of the preview sensors 11.

The vehicle C also includes a steering angle sensor 12 (a vehicle turn degree detector), a steering torque sensor 13 (a vehicle turn degree detector), a yaw rate sensor 14 (a vehicle turn degree detector), a vehicle speed sensor 15 (a vehicle speed detector, a slip detector), and a wheel speed sensor 16 (a slip detector).

The steering angle sensor 12 is configured to detect a steering angle θ (a turn degree; see FIG. 5) of a steering system of the vehicle C. For example, the steering angle sensor 12 detects a steering angle θ (a turning angle) of a steering wheel H using an angle sensor that measures a rotation angle of the electric motor 3.

The steering torque sensor 13 (referred to as a "torque sensor" in FIG. 1) is configured to detect a steering torque (manual steering effort) that is inputted by the driver via the steering wheel H. The steering torque sensor 13 can be used as a vehicle turn degree detector in place of the steering angle sensor 12.

The yaw rate sensor 14 is configured to detect a yaw rate (angular speed of turning) of the vehicle C. The yaw rate sensor 14 can be used as a vehicle turn degree detector in place of the steering angle sensor 12 or steering torque sensor 13.

The vehicle speed sensor 15 is configured to detect a travelling speed of the vehicle C (hereinafter "vehicle speed Vc").

The wheel speed sensor 16 is configured to detect a rotation speed of a wheel W as a wheel speed pulse signal. Although FIG. 1 shows the wheel speed sensor 16 for just one wheel W, there is in fact a wheel speed sensor 16 for each of the front wheels WF and WF and rear wheels WR and WR.

The controller 100 is configured to perform damper control of the front wheel WF and rear wheel WR. The controller 100 includes a CPU (a central processing unit), ROM (read only memory), RAM (random access memory), various interfaces, and an electronic circuit. The damper control improves ride comfort of the vehicle C by easing or absorbing vibrations of a vehicle body relative to a road surface R through control of the front damper DF and rear damper DR.

The controller 100 is connected to the preview sensor 11, steering angle sensor 12, steering torque sensor 13, yaw rate sensor 14, vehicle speed sensor 15, and wheel speed sensor 16. The controller 100 is configured to obtain various types of information including a road surface state, a steering angle θ, a steering torque, a yaw rate, a vehicle speed Vc, and a wheel speed. In FIG. 1, the controller 100 and each of the sensors 11-16 are mutually connected by a communication medium such as Controller Area Network (CAN).

FIG. 2 is a diagram showing a configuration of a vehicle installed with a damper control apparatus in accordance with an embodiment.

As shown in FIG. 2, the preview sensor 11 is configured to detect a state of a road surface R (a road surface state) at a front part side of the vehicle C. The preview sensor 11 is provided on a frame member F of a front part of the body of the vehicle C. The preview sensor 11 is positioned on the frame member F so that the preview sensor 11 is further to the front compared to a front wheel WF. According to the embodiment, the preview sensor 11 is provided to the front of a front wheel WF but not around a rear wheel WR. According to the embodiment, the preview sensor 11 is provided on the left front wheel WF as well as on the right front wheel WF.

As shown by a thick arrow in FIG. 2, the preview sensor 11 is configured to detect a state of a road surface R immediately in front of a front wheel WF. The preview sensor 11 can be selected from sensors such as a radar type sensor, camera type sensor, or laser type sensor as deemed appropriate. The preview sensor 11 is not limited to be configured from a single sensor. In one or more embodiments, the preview sensor 11 is configured from a combination of different types of sensors such as a camera type sensor and laser type sensor.

Figure 3:
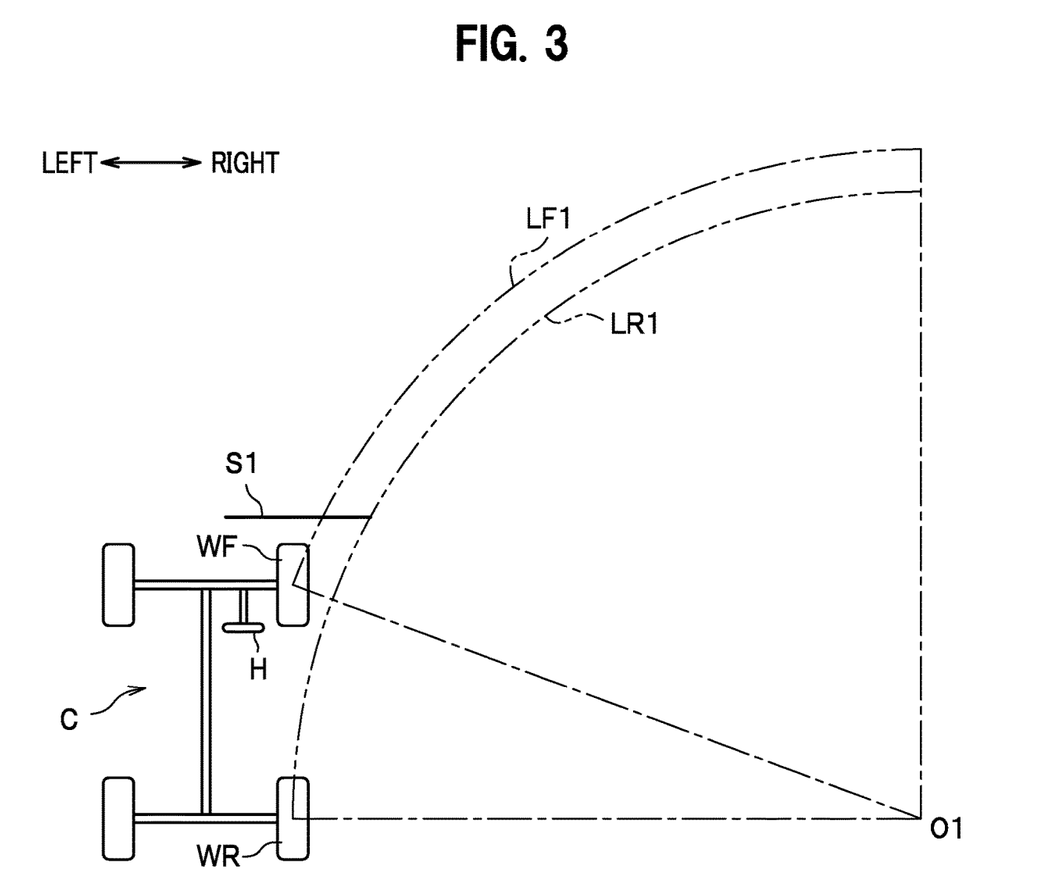
FIG. 3 is a schematic diagram showing travel paths of front and rear wheels when a steering angle is less than or equal to a predetermined steering angle threshold.

FIG. 3 is a schematic diagram showing travel paths of a front wheel and a rear wheel when the steering angle is less than or equal to a predetermined steering angle threshold.

As shown in FIG. 3, when the steering wheel H is operated so that the vehicle C turns to the right with the steering angle θ at an angle that is less than or equal to a predetermined steering angle threshold, the front wheel WF indicated in FIG. 3 moves along a projected line of travel (a travel path) LF1. The projected line of travel LF1 is an arc-shaped line around a pivot O1. The rear wheel WR indicated in FIG. 3 moves along a projected line of travel (a travel path) LR1, another arc-shaped line around the pivot O1. Because of the difference in the paths taken by the inner wheels (the front wheel WF and rear wheel WR indicated in FIG. 3) when the vehicle C turns, the projected line of travel LR1 of the rear wheel WR has a smaller radius (in other words, LR1 travels closer to the pivot O1) than the projected line of travel LF1 of the front wheel WF.

A preview sensor 11 detects a road surface state in front of the front wheel WF (in front of the vehicle C). For example, the preview sensor 11 takes a measurement across a predetermined measurement range (a predetermined range) S1 in a lateral direction (widthwise) as shown in FIG. 3. The predetermined measurement range S1 is set so that the projected line of travel LF1 and the predetermined measurement range S1 overlap even when the steering angle θ (a turning angle) of the front wheel WF is maximized. In this way, for the front wheel WF, the road surface state can be detected for any steering angle θ.

When the steering angle θ is less than or equal to the predetermined steering angle threshold, both the front wheel WF and rear wheel WR pass through the predetermined measurement range S1. The predetermined steering angle threshold is a maximum steering angle at which there is a difference between the (curvature) radius of the travel path of the front wheel WF and the (curvature) radius of the travel path of the rear wheel WR but the travel path of the rear wheel WR falls within the measurement range of the preview sensor 11. Because of this, the front damper DF of the front wheel WF and the rear damper DR of the rear wheel WR are controlled based on a detected value that is detected by the preview sensor 11. Therefore, the front damper DF and rear damper DR are controlled by the controller 100 so that vibrations of the vehicle body may be reduced appropriately.

Figure 4:
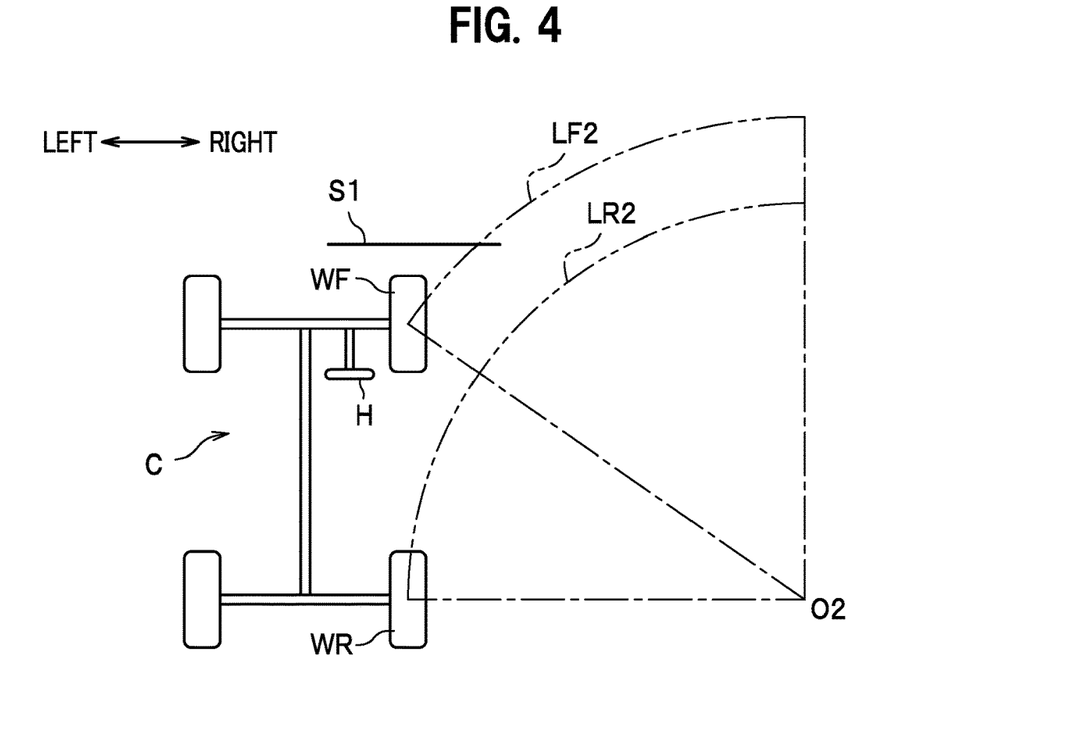
FIG. 4 is a schematic diagram showing travel paths of front and rear wheels when a steering angle exceeds a predetermined steering angle threshold.

FIG. 4 is a schematic diagram showing travel paths of a front wheel and a rear wheel when the steering angle exceeds the predetermined steering angle threshold.

As shown in FIG. 4, when the steering wheel H is operated so that the vehicle C turns to the right with the steering angle θ at an angle that exceeds the predetermined steering angle threshold, the front wheel WF indicated in FIG. 4 moves along a projected line of travel (a travel path) LF2. The projected line of travel LF2 is an arc-shaped line around a pivot O2. The rear wheel WR indicated in FIG. 4 moves along a projected line of travel (a travel path) LR2, another arc-shaped line around the pivot O2. Because of the difference in the paths taken by the inner wheels (the front wheel WF and rear wheel WR indicated in FIG. 4), when the vehicle C turns, the projected line of travel LR2 of the rear wheel WR has a smaller radius (in other words, LR2 travels closer to the pivot O2) than the projected line of travel LF2 of the front wheel WF.

When the steering angle θ exceeds the predetermined steering angle threshold, the front wheel WF passes through the predetermined measurement range S1, but the rear wheel WR passes through a location outside the measurement range S1. Therefore, controlling the rear damper DR based on the detected road surface state can cause vibrations of the vehicle body to increase, causing ride comfort to decline. In the embodiment of the disclosure therefore, damper control of the rear damper WR (control of the rear damper DR) is reduced according to the steering angle θ.

Figure 5:
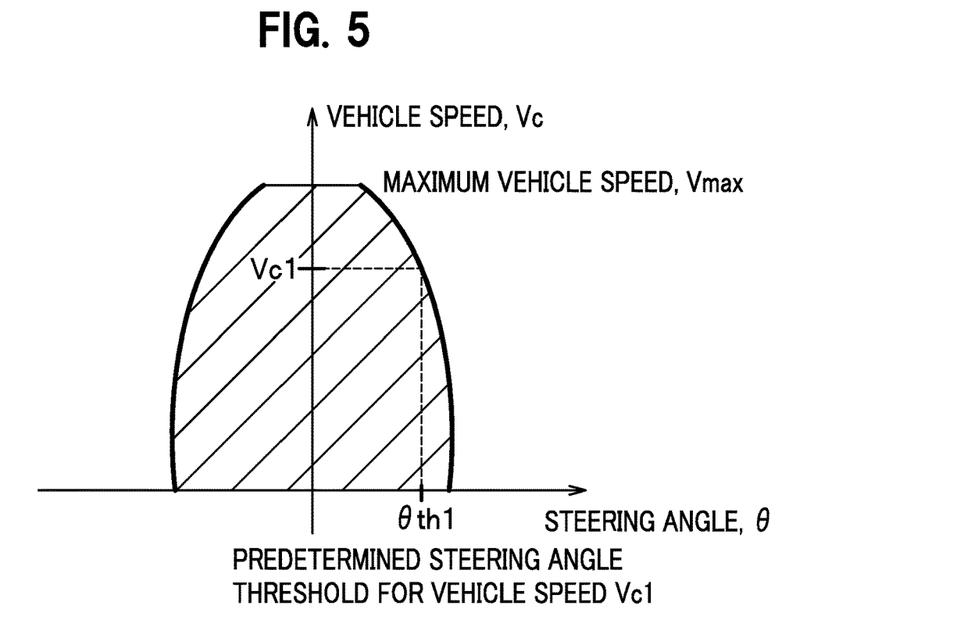
FIG. 5 is a map indicating relationship between a steering angle and vehicle speed.

FIG. 5 is a map indicating relationship between the vehicle speed and steering angle.

As shown in FIG. 5, a region shaded with diagonal lines is the region where damper control of the rear wheel WR (control of the rear damper DR) based on the preview sensor 11 is performed. The thick lines bordering said region in FIG. 5 show relationship between the vehicle speed Vc (travelling speed of the vehicle C) and predetermined steering angle threshold. As the vehicle speed Vc increases, the predetermined steering angle threshold becomes smaller. In other words, as the vehicle speed Vc increases, a steering angle θ (an angle of the steering wheel) that exceeds the predetermined steering angle threshold becomes smaller. When the vehicle speed Vc is large, damper control of the rear wheel WR (control of the rear damper DR) is not applied even when the steering angle θ is small. In the case of FIG. 5, maximum vehicle speed (Vmax) is set, and when the vehicle speed Vc exceeds this maximum velocity, damper control of the rear wheel WR (control of the rear damper DR) based on the preview sensor 11 is not performed.

As shown in FIG. 5, when the vehicle speed Vc has a negative value (when the vehicle C moves backwards), control of the rear wheel WR (control of the rear damper DR) based on the preview sensor 11 is not applied. This is because a preview sensor 11 is not provided at the rear wheel WR and damper control based on a preview sensor 11 cannot be performed. In one or more embodiments, determination on whether the vehicle C is moving backwards is made by detecting the selected position of a shift lever (not shown) provided at a driver seat of the vehicle C or by detecting which way a wheel W is rotating via a wheel speed sensor 16 (a wheel rotating in reverse will give a negative measurement).

Figure 6:
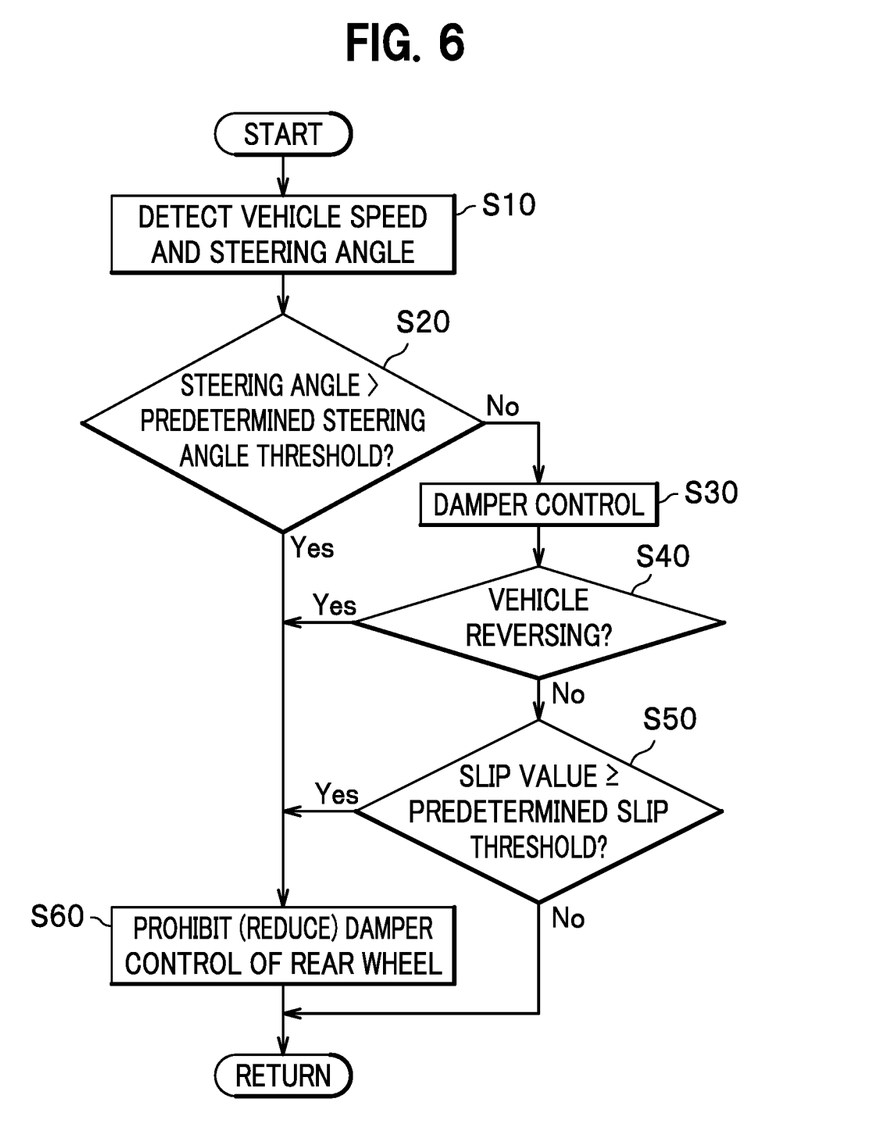
FIG. 6 is a flowchart showing an operation of a damper control apparatus in accordance with at least one embodiment of the disclosure.

FIG. 6 is a flowchart showing an operation of a damper control apparatus in accordance with an embodiment of the disclosure.

When a start button (not shown) or an ignition switch (not shown) of the vehicle C is turned on, the preview sensor 11 is activated and starts the detection of a road surface state. At step S10, the controller 100 detects a vehicle speed Vc of the vehicle C and a steering angle θ of the steering wheel H as shown in FIG. 6. The steering angle θ of the steering wheel H is detected by the steering angle sensor 12. In one or more embodiments, the steering angle θ may be detected with the steering torque sensor 13 or yaw rate sensor 14.

At step S20, the controller 100 determines whether or not the steering angle detected by the steering angle sensor 12 exceeds a predetermined steering angle threshold. When the controller 100 determines that the steering angle θ exceeds the predetermined steering angle threshold (S20, Yes) the process advances to step S60. When the controller 100 determines that the steering angle θ is less than or equal to the predetermined steering angle threshold (S20, No) the process advances to step S30. As has been described already using FIG. 4, a steering angle θ that exceeds the predetermined steering angle threshold is a steering angle at which the rear wheel WR passes through a location that does not overlap with the measurement range S1 of the preview sensor 11.

By referencing the map of FIG. 5, the controller 100 changes the predetermined steering angle threshold according to the vehicle speed Vc obtained at step S10. When the vehicle speed Vc is high, the predetermined steering angle threshold is changed to become smaller. When the vehicle speed Vc is low, the predetermined steering angle threshold is changed to become greater.

At step S60, the controller 100 prohibits damper control of the rear wheel WR. Therefore, damper control of the rear wheel WR (control of the rear damper DR) based on a detected value of the preview sensor 11 is not performed. In one or more embodiments, rather than prohibiting damper control (in which case damper control based on a detected value of the preview sensor 11 is zero) of the rear wheel WR, damper control of the rear wheel WR may be reduced. Reduced damper control includes cases where damper control of the rear wheel WR is not prohibited, such as cases where a weighted value of control is changed so that damper control of the rear wheel WR is not completely zero or cases where control based on a detected value of the preview sensor 11 is taken into consideration but is not used for substantial control.

At step S30, the controller 100 performs damper control. When damper control is already being performed, then damper control is continued. Based on a detected value of the preview sensor 11, damper control of the front wheel WF and rear wheel WR (control of the front damper DF and control of the rear damper DR) are performed.

At step S40, the controller 100 determines whether the vehicle C is moving backwards or not. When the vehicle C is moving backwards (S40, Yes), the process advances to step S60. When the vehicle C is not moving backwards (S40, No), the process advances to step S50.

At step S50, the controller 100 determines whether a slip value of the vehicle C is greater than or equal to a predetermined slip threshold. When the slip value is greater than or equal to the predetermined slip threshold (S50, Yes), the process advances to step S60. When the slip value is less than the predetermined slip threshold (S50, No), the process returns to the start of the flowchart. The slip value is decided based on a slip ratio used by an anti-lock braking system (ABS) installed in the vehicle C. A slip value is greater than or equal to a predetermined slip threshold when a slip value derived from vehicle speed Vc and wheel speed Vw is greater than or equal to the predetermined slip threshold or when the ABS is activated.

The object of the disclosure is to provide a damper control apparatus that can reduce a decline in ride comfort.

According to an embodiment of the disclosure, a damper control apparatus that is capable of reducing a decline in ride comfort is provided.

As described above, a damper control apparatus 1 according to an embodiment is a damper control apparatus 1 that controls a front damper DF provided for a front wheel WF and a rear damper DR provided for a rear wheel WR. The damper control apparatus 1 includes a preview sensor 11 configured to detect a state of a road surface in front of a vehicle C, a steering angle sensor 12 (a steering torque sensor 13, a yaw rate sensor 14) configured to detect a steering angle θ (a yaw rate) of the vehicle C, and a controller 100 configured to control the front damper DF and the rear damper DR based on a detected value of the preview sensor 11. In response to the steering angle sensor 12 detecting a steering angle θ that exceeds a predetermined steering angle threshold, the controller 100 is configured to reduce control of the rear damper DR at the rear wheel WR that is based on the detected value of the preview sensor 11 (see steps S20 and S60 of FIG. 6).

Because the possibility of the rear wheel WR taking a different travel path from that of the front wheel WF becomes high when the steering angle θ exceeds the predetermined steering angle threshold, by reducing damper control of the rear wheel WR using the preview sensor 11, it is possible to reduce a decline in ride comfort.

In one or more embodiments, the damper control apparatus 1 also includes a vehicle speed sensor 15 that is configured to detect a vehicle speed Vc of the vehicle C. The controller 100 is further configured to change the predetermined steering angle threshold according to the vehicle speed Vc detected by the vehicle speed sensor Vc (see FIG. 5).

Because the travel path of the rear wheel WR (projected lines of travel LR1 and LR2 of FIGS. 3 and 4) differs with vehicle speed Vc, by changing the predetermined steering angle threshold according to the vehicle speed Vc, it is further possible to reduce a decline in ride comfort.

In one or more embodiments, the controller 100 is further configured so that, when the vehicle C is moving backwards, control of the rear damper DR at the rear wheel WR that is based on the detected value of the preview sensor 11 is reduced.

Because damper control of the rear wheel WR using the preview sensor 11 is not possible when the vehicle C is moving backwards, by reducing damper control of the rear wheel WR that is based on the preview sensor 11, it is possible to reduce a decline in ride comfort.

In one or more embodiments, the damper control apparatus 1 also includes a wheel speed sensor 16 so that together with the vehicle speed sensor 15 a degree of slip of a wheel W may be detected. When the steering angle θ is less than or equal to the predetermined steering angle threshold and a degree of slip that is greater than or equal to a predetermined slip threshold is detected for the front wheel WF and/or rear wheel WR, the controller 100 is configured to reduce damper control of the rear wheel WR that is based on the preview sensor 11 (see steps S50 and S60 of FIG. 6).

Because it is possible for the travel path of a wheel W (projected lines of travel LR1, LR2 of FIGS. 3 and 4) to change when the wheel W slips, by reducing damper control of the rear wheel WR that is based on the preview sensor 11, it is possible to reduce a decline in ride comfort.

Embodiments of the disclosure are not limited to those described above. Variations of the above-mentioned embodiments are possible. For example, in the detailed description, a vehicle C whose front wheels are turned with steering has been used as an example. The damper control apparatus 1 may be applied to a vehicle with four-wheel steering (all the front and rear wheels turn with steering).

According to the above-mentioned embodiments, the controller 100 is configured to determine whether or not the steering angle θ detected by the steering angle sensor 12 exceeds a predetermined steering angle threshold (step S20 of FIG. 6). According to one or more variations, the controller 100 may be configured to determine whether or not the steering angle θ detected by the steering angle sensor 12 is greater than or equal to a predetermined second steering angle threshold. In such variations, when the steering angle θ is less than the predetermined second steering angle threshold, both the front wheel WF and rear wheel WR pass through the predetermined measurement range S1. When the steering angle θ is greater than or equal to the predetermined second steering angle threshold, the front wheel WF passes through the predetermined measurement range S1, but the rear wheel WR passes through a location outside the measurement range S1. The predetermined second steering angle threshold is a minimum steering angle at which there is a difference between the (curvature) radius of the travel path of the front wheel WF and the (curvature) radius of the travel path of the rear wheel WR and at which the travel path of the rear wheel WR does not fall within the measurement range of the preview sensor 11. In such variations, when the steering angle sensor 12 detects a steering angle θ that is greater than or equal to a predetermined second steering angle threshold, the controller 100 is configured to reduce control of the rear damper DR at the rear wheel WR that is based on the detected value of the preview sensor 11 (see step S60 of FIG. 6).

The preview sensor 11 detects a road surface state in front of the front wheel WF (in front of the vehicle C) and may, for example, take a measurement across a predetermined measurement range (a predetermined range) S1 that runs parallel to a front wheel axle of the front wheels WF.

What is claimed is:

1. A damper control apparatus for controlling a front damper with variable damping force at a front wheel and a rear damper with variable damping force at a rear wheel, the damper control apparatus comprising:
    a road surface state detector configured to detect a road surface state in front of a vehicle;
    a vehicle turn degree detector configured to detect a degree of turn of the vehicle; and
    a controller configured to control the front damper provided at the front wheel and the rear damper provided at the rear wheel based on a detected value of the road surface state detector,
    wherein, in response to the vehicle turn degree detector detecting a degree of turn that exceeds a predetermined turn degree threshold, the controller is configured to reduce control of the rear damper that is based on the detected value of the road surface state detector.

2. The damper control apparatus according to claim 1, further comprising:
    a vehicle speed detector configured to detect a vehicle speed of the vehicle,
    wherein the controller is further configured to change the predetermined turn degree threshold in accordance with the vehicle speed that is detected by the vehicle speed detector.

3. The damper control apparatus according to claim 1, wherein the controller is configured to reduce the control of the rear damper in response to the vehicle moving backwards.

4. The damper control apparatus according to claim 1, further comprising:
    a slip detector configured to detect a slip value of the vehicle,
    wherein, in response to detecting a slip value that is greater than or equal to a predetermined slip threshold for at least one of the front wheel or the rear wheel when the degree of turn is less than or equal to the predetermined turn degree threshold, the controller is configured to reduce the control of the rear damper.

5. The damper control apparatus according to claim 2, wherein the controller is configured to reduce the control of the rear damper in response to the vehicle moving backwards.

6. The damper control apparatus according to claim 2, further comprising:
    a slip detector configured to detect a slip value of the vehicle,
    wherein, in response to detecting a slip value that is greater than or equal to a predetermined slip threshold for at least one of the front wheel or the rear wheel when the degree of turn is less than or equal to the predetermined turn degree threshold, the controller is configured to reduce the control of the rear damper.

7. The damper control apparatus according to claim 3, further comprising:
   a slip detector configured to detect a slip value of the vehicle,
   wherein, in response to detecting a slip value that is greater than or equal to a predetermined slip threshold for at least one of the front wheel or the rear wheel when the degree of turn is less than or equal to the predetermined turn degree threshold, the controller is configured to reduce the control of the rear damper.

8. The damper control apparatus according to claim 5, further comprising:
   a slip detector configured to detect a slip value of the vehicle,
   wherein, in response to detecting a slip value that is greater than or equal to a predetermined slip threshold for at least one of the front wheel or the rear wheel when the degree of turn is less than or equal to the predetermined turn degree threshold, the controller is configured to reduce the control of the rear damper.

\* \* \* \* \*